(12) United States Patent
Jamiu et al.

(10) Patent No.: US 9,782,768 B2
(45) Date of Patent: Oct. 10, 2017

(54) METHOD FOR REMOVING HEAVY METALS FROM AN AQUEOUS SOLUTION WITH CROSS-LINKED COPOLYMERS

(71) Applicant: KING FAHD UNIVERSITY OF PETROLEUM AND MINERALS, Dhahran (SA)

(72) Inventors: Zakariyah Abdulkareem Jamiu, Dhahran (SA); Tawfik Abdo Saleh, Dhahran (SA); Shaikh Asrof Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/282,405

(22) Filed: Sep. 30, 2016

(65) Prior Publication Data
US 2017/0113215 A1   Apr. 27, 2017

Related U.S. Application Data

(63) Continuation of application No. 14/918,722, filed on Oct. 21, 2015, now Pat. No. 9,480,979.

(51) Int. Cl.
| | |
|---|---|
| *B01J 39/18* | (2017.01) |
| *B01J 39/04* | (2017.01) |
| *C08G 75/20* | (2016.01) |
| *C02F 1/68* | (2006.01) |
| *C02F 1/28* | (2006.01) |
| *C02F 101/20* | (2006.01) |
| *C02F 103/06* | (2006.01) |

(52) U.S. Cl.
CPC .......... *B01J 39/185* (2013.01); *B01J 39/046* (2013.01); *C02F 1/285* (2013.01); *C02F 1/683* (2013.01); *C08G 75/20* (2013.01); *C02F 2101/20* (2013.01); *C02F 2103/06* (2013.01)

(58) Field of Classification Search
CPC ....... B01J 39/185; B01J 39/046; C08G 75/20; C02F 1/683; C02F 1/285; C02F 2101/20; C02F 2103/06
USPC .......................................................... 521/31
See application file for complete search history.

(56) References Cited

U.S. PATENT DOCUMENTS

| | | | | |
|---|---|---|---|---|
| 8,614,260 | B1 * | 12/2013 | Hamouz | B01J 20/267 210/636 |
| 8,871,822 | B2 * | 10/2014 | Ali | C08G 75/20 210/636 |
| 8,937,104 | B2 * | 1/2015 | Ali | C08G 75/205 521/28 |

OTHER PUBLICATIONS

Haladu et al. "Cyclopolymerization protocol for the synthesis of a new poly( electrolyte-zwitterion) containing quaternary nitrogen, carboxylate, and sulfonate functionalities", European Polymer Journal, (2013) (www.elsevier.com/locate/europol).*

Haladu et al. "Cyclopolymerization protocol for the synthesis of a new poly(electrolyte-zwitterion) containing quaternary nitrogen, carboxylate, and sulfonate functionalities", European Polymer Journal, (2013) (www.elsevier.com/locate/europol).

* cited by examiner

*Primary Examiner* — Michael M Bernshteyn
(74) *Attorney, Agent, or Firm* — Oblon, McClelland, Maier & Neustadt, L.L.P.

(57) ABSTRACT

Cross-linked cyclocopolymers made up of one or more quaternary ammonium salts and sulfur dioxide as monomers. One of the quaternary ammonium salts is also an aspartic acid derivative. The cross-linked copolymers include a repeating unit with multiple chelating centers that different metal ions can bind to. The cross-linked copolymers are zwitterionic or anionic, and can be in either an acidic form or a basic form. A method for removing metal ions from an aqueous sample with these cross-linked copolymers is also described.

11 Claims, 6 Drawing Sheets

US 9,782,768 B2

METHOD FOR REMOVING HEAVY METALS FROM AN AQUEOUS SOLUTION WITH CROSS-LINKED COPOLYMERS

CROSS-REFERENCE TO RELATED APPLICATIONS

This application is a continuation of Ser. No. 14/918,722.

STATEMENT OF FUNDING ACKNOWLEDGEMENT

This project was funded by the National Plan for Science, Technology and Innovation—King Abdulaziz City for Science and Technology—the Kingdom of Saudi Arabia, award number (11-ADV2132-04).

BACKGROUND OF THE INVENTION

Technical Field

The present invention relates to polymers. More particularly, the present invention relates to cross-linked copolymers containing polymerized units of one or more quaternary ammonium salt monomers. These polymers are suitable for water treatment applications, specifically removal of heavy metal ions by adsorption.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Heavy metals are released into the surface and ground water because of various activities such as electroplating, and pigment and paint manufacturing. Because of their toxicity and tendency to bioaccumulate, the removal of metals from industrial effluents before discharge into the environment is required to mitigate any impact on plants, animals and humans [Heidari, A., H. Younesi, and Z. Mehraban, Removal of Ni(II), Cd(II), and Pb(II) from a ternary aqueous solution by amino functionalized mesoporous and nano mesoporous silica. Chemical Engineering Journal, 2009. 153(1-3); p. 70-79 (reference), incorporated herein by reference in its entirety]. Lead is one of the most toxic metals that are widely used in various industries, such as battery and glass manufacturing, metal plating and finishing, printing and tanning. The permissible levels of lead in drinking and waste water are 0.05 mg/L and 0.005 mg/L, respectively [(EPA), E.P.A., Environmental Pollution Control Alternatives. 1990 (EPA/625/5-90/0255 CPA/625/4-89/023) (reference), incorporated herein by reference in its entirety]. Several conventional methods are used for the removal of pollutants [Jiang, M.-q., et al, Removal of Pb(II) from aqueous solution using modified and unmodified kaolinite clay. Journal of Hazardous Materials, 2009. 170(1): p. 332-339 (reference), incorporated herein by reference in its entirety]. However, these technologies are either expensive for the treatment and disposal of the secondary toxic sludge or ineffective when the toxic metal is present in wastewaters at low concentrations [Rao, M. M., et al., Removal of some metal ions by activated carbon prepared from Phaseolus aureus hulls. Journal of Hazardous Materials, 2009. 166(2-3); p. 1006-1013 (reference), incorporated herein by reference in its entirety].

Alternatively, heavy metals in wastewater are removed by adsorption which is both efficient and relatively simple. A successful adsorption process depends on the adsorption performance of the adsorbents. Various conventional adsorbents have been reported for the removal of lead from wastewaters including activated carbon, clay, metal oxides nanoparticles and nanomaterials [Ghaedi, M., et al., Comparison of the efficiency of palladium and silver nanoparticles loaded on activated carbon and zinc oxide nanorods loaded on activated carbon as new adsorbents for removal of Congo red from aqueous solution: Kinetic and isotherm study. Materials Science and Engineering: C, 2012. 32(4): p. 725-734; Dias, J. M., et al., Waste materials for activated carbon preparation and its use in aqueous-phase treatment: A review. Journal of Environmental Management, 2007. 85(4): p. 833-846; Erdem, E., N. Karapinar, and R. Donat, The removal of heavy metal cations by natural zeolites. Journal of Colloid and Interface Science, 2004. 280(2): p. 309-314 (references), each incorporated herein by reference in their entirely". However, small particle size of nanoparticle results in the difficulty of separation from solution, which limits the application in water treatment. The new adsorbents requested by the industry should have high capacity, rapid adsorption kinetics and operational stability at elevated temperatures in the presence of steam and other reaction components. The new adsorption processes may then take advantage of such materials.

Polymers could represent good adsorbent candidates displaying a pronounced chemical versatility given by the great number of chemical functionalities or motifs present in their structures. Recently, researchers have focused on the syntheses of zwitterionic cross-linked inorganic and/or organic hybrid polymer materials for the removal of heavy metal ions via electrostatic effects [Liu, J., et al., Novel negatively charged hybrids. 3. Removal of $Pb^{2+}$ from aqueous solution using zwitterionic hybrid polymers as adsorbent. Journal of Hazardous Materials, 2010. 173(1-3): p. 438-444; Liu, J., et al., Preparation of zwitterionic hybrid polymer and its application for the removal of heavy metal ions from water. Journal of Hazardous Materials, 2010. 178(1-3): p. 1021-1029; Liu, J., et al., Novel negatively charged hybrids. 1. copolymers: Preparation and adsorption properties. Separation and Purification Technology, 2009. 66(1): p. 135-142 (references), each incorporated herein by reference, in their entirety]. Considerable attention has been given to synthesize chelating agents containing an amino methyl phosphonate motif owing to its extraordinary chelating properties in extracting heavy metal ions from wastewater. More recently, a porous resin with Schiff base chelating groups for removal of heavy metal ions from aqueous solutions has been synthesized [Ceglowski, M. and G. Schroeder, Preparation of porous resin with Schiff base chelating groups for removal of heavy metal ions from aqueous solutions. Chemical Engineering Journal, 2015. 263(0): p. 402-411 (reference), incorporated herein by reference in its entirety].

In view of the foregoing, there exists a need for novel materials and compositions with high adsorption capacity for $Pb^{2+}$ and advantageously, a range of other metals, over a short equilibrium time.

BRIEF SUMMARY OF THE INVENTION

According to a first aspect, the present disclosure relates to a copolymer comprising an aspartic acid derivative, a quaternary ammonium salt and sulfur dioxide. The aspartic acid derivative, the quaternary ammonium salt and the sulfur dioxide are cyclopolymerized to form the copolymer. In the copolymer, a sulfur dioxide molecule connects every two molecules of the aspartic acid derivative, the quaternary ammonium salt, or both.

In one or more embodiments, the quaternary ammonium salt cross-links one polymer chain of the copolymer to another polymer chain of the copolymer.

In some embodiments, the aspartic acid derivative comprises a quaternary nitrogen atom.

In certain embodiments, the aspartic acid derivative is represented by Formula A:

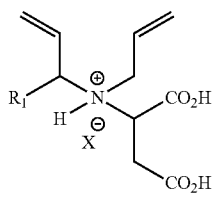

Formula A where $R_1$ is a hydrogen, a halide or an optionally substituted $C_1$-$C_6$ alkyl group and $X^-$ is $F^-$, $Cl^-$, $Br^-$, $I^-$, $NO_3^-$ or other suitable monoanion other than $OH^-$.

In one embodiment, $R_1$ is a hydrogen and $X^-$ is $Cl^-$.

In some embodiments, the quaternary ammonium salt is represented by Formula B:

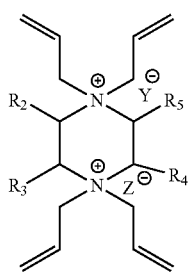

Formula B where $R_2$-$R_5$ are each independently a hydrogen, a halide or an optionally substituted $C_1$-$C_6$ alkyl group and $Y^-$ and $Z^-$ are each $F^-$, $Cl^-$, $Br^-$, $I^-$, $NO_3^-$ or other suitable monoanion other than $OH^-$.

In one embodiment, $R_2$-$R_5$ are each a hydrogen and $Y^-$ and $Z^-$ are each $Cl^-$.

In certain embodiments, the copolymer is in a basic and anionic form.

In some embodiments, the copolymer has a repeating unit represented by Formula 1 or Formula 2:

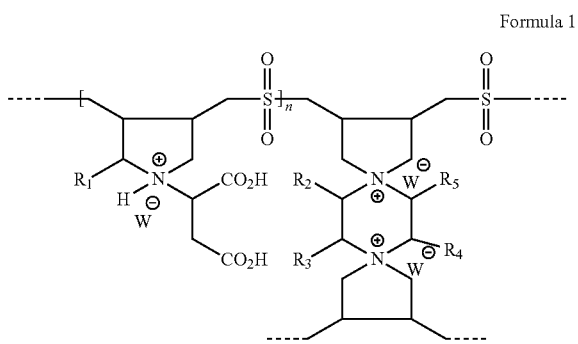

Formula 1

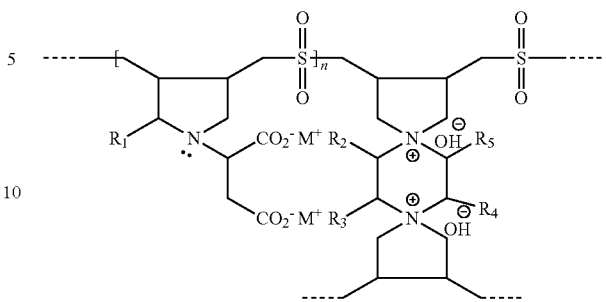

Formula 2 where $R_1$-$R_5$ are each independently a hydrogen, a halide, an optionally substituted methyl group, or an optionally substituted ethyl group; each $W^-$ in Formula 1 is $F^-$, $Cl^-$, $Br^-$, $I^-$, $NO_3^-$ or other suitable monoanion other than $OH^-$; each $M^+$ in Formula 2 is $Li^+$, $Na^+$, $K^+$ or other suitable monocation other than $H^+$; and n=9-19.

In one embodiment, the repeating unit of the copolymer is represented by Formula 1, where $R_1$-$R_5$ are each a hydrogen and $W^-$ is $Cl^-$.

In another embodiment, tire repeating unit of the copolymer represented by Formula 2, where $R_1$-$R_5$ are each a hydrogen and $M^+$ is $Na^+$.

In some embodiments, the copolymer has a $Pb^{2+}$ adsorption capacity of 50-100 mg g$^{-1}$ based on a total weight of the copolymer.

According to a second aspect, the present disclosure relates to a method for making the copolymer. The method comprises cyclopolymerizing the aspartic acid derivative, the quaternary ammonium salt and the sulfur dioxide in the presence of an initiator and a non-aqueous solvent to form a cross-linked polyzwitterionic acid polymer and optionally treating the polyzwitterionic acid polymer with a base to form a cross-linked anionic polyelectrolyte polymer.

In one embodiment, the initiator is azoisobutyronitrile and the non-aqueous solvent is dimethylsulfoxide.

According to a third aspect, the present disclosure relates to a method for removing $Pb^{2+}$ from an aqueous sample. The method comprises contacting the aqueous sample with the copolymer to adsorb $Pb^{2+}$ from the aqueous sample onto the copolymer.

In one or more embodiments, the copolymer has a concentration of 0.02-5.0 g L$^{-1}$ in the aqueous sample.

In some embodiments, the contacting is carried out at a temperature of 10-100° C.

In certain embodiments, the contacting is carried out at an aqueous sample pH range of 3 to 9.

In certain embodiments, the contacting is carried out for 5-180 min.

In one embodiment, the contacting removes more than 90% of the $Pb^{2+}$ present in the aqueous sample.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
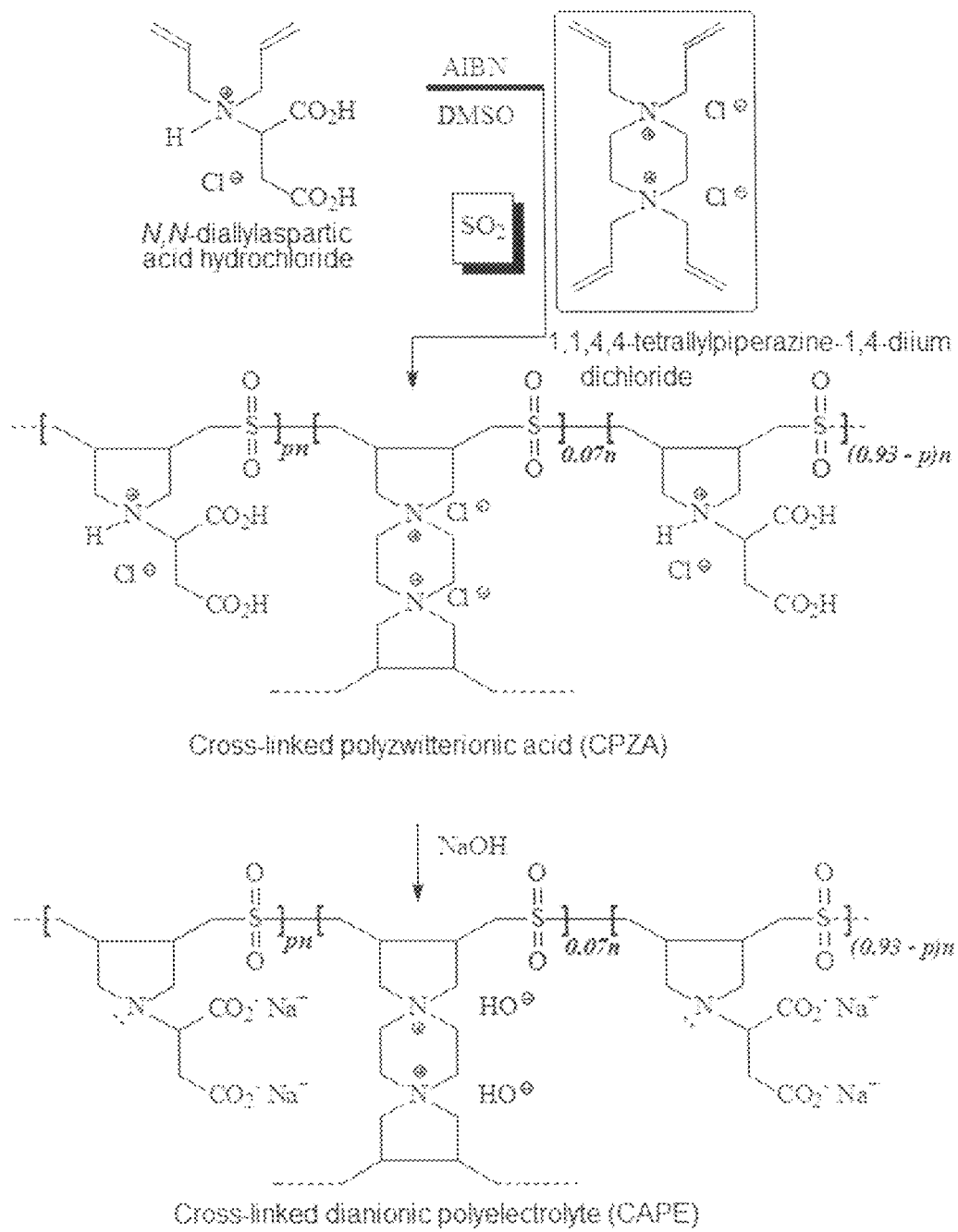
FIG. 1 is a scheme illustrating synthesis of a crosslinked polyzwitterionic acid or a crosslinked dianionic polyelectrolyte according to one embodiment.

Referring now to the drawings, wherein like reference numerals designate identical or corresponding pails throughout the several views.

The present disclosure provides cross-linked copolymers where one or more of the monomers constituting the copolymer each contain one or more quaternary nitrogen atoms. These quaternary ammonium salt monomers are neutral and zwitterionic, where positive and negative electrical charges of 1 to 2 are present in each monomeric molecule at equal amounts. In some embodiments, the copolymer has more than one quaternary ammonium salt monomer where at least one of the monomers is an aspartic acid derivative monomer. In some embodiments, at least one of the quaternary ammonium salt monomers is also a cross-linking agent for the copolymer. The cross-linked copolymer macromolecule, formed by cyclopolymerization of the different monomers, can exist in an acidic form or a basic form. Preferably, the copolymer is in a basic form.

Monomers constituting a copolymer provided herein are represented by Formula A, Formula B and Formula C:

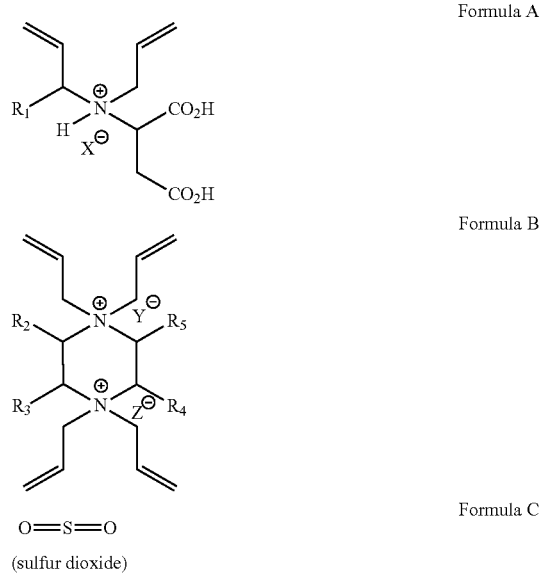

Formula A

Formula B

Formula C (sulfur dioxide)

where $R_1$-$R_5$ are each independently a hydrogen, a halide, an optionally substituted $C_1$-$C_6$ alkyl group, preferably a methyl group, or an optionally substituted ethyl group, preferably a hydrogen; $X^-$ is $F^-$, $Cl^-$, $Br^-$, $I^-$, $NO_3^-$ or other suitable monoanion other than $OH^-$, preferably a halide, more preferably $Cl^-$; and when cyclopolymerized into a copolymer, every two monomers represented by Formula A, Formula B, or both are connected by a sulfur dioxide molecule. In other words, in certain embodiments, each monomer represented by Formula A or Formula B is sulfonized prior to or during the cyclopolymerization.

In one embodiment, the monomers of the copolymer include N,N-diallylaspartic acid hydrochloride, 1,1,4,4-tetrallylpiperazine-1,4-diium dichloride and sulfur dioxide.

In certain embodiments, a copolymer of the present disclosure, in addition to the monomers represented by Formulas A, B and sulfur dioxide, further include at least one selected from the group consisting of a monomer having a mono-, di-, tri- or tetraallyl group; a monomer having one or more carboxylic acid functional groups; a monomer containing one or more quaternary nitrogen atoms that are optionally part of a 3- to 8-membered heterocyclic ring; nitrogen dioxide; nitrogen disulfide; carbon dioxide; and carbon disulfide.

For purposes of the present invention, "cross-linked" or "network" or "thermoset" polymers refer to natural or synthetic polymers and resins that contain branches that connect polymer chains via covalent bonds. The cross-linking can alter the physical and mechanical properties of the polymer. The vulcanization of rubber, for example, results from the introduction of short chains of sulfur atoms that link the polymer chains in natural rubber. As the number of cross-links increases, the polymer becomes more rigid.

Cross-links can be formed by chemical reactions that are initiated by heat, pressure, change in pH, or radiation, with or without the presence of a cross-linking agent and/or a catalyst.

In one or more embodiments, one of the monomers acts as a cross-linking agent and is therefore a cross-linking monomer. In one embodiment, the cross-linking monomer is the quaternary ammonium salt monomer represented by Formula B, and each polymer chain of a copolymer described herein contains 5-10% of this monomer based on a total number of monomers represented by Formulas A and B, preferably 5-8%, more preferably 6-8%. In one embodiment, each polymer chain of the copolymer contains 7% of the monomer represented by Formula B relative to a total number of monomers represented by Formulas A and B. In one embodiment, the cross-linking quaternary ammonium salt monomer is 1,1,4,4-tetrallylpiperazine-1,4-diium dichloride.

For purposes of the present invention, "quaternary ammonium salt", which is also called "quaternary ammonium compound" or "quaternary amine", refers to a salt having one or more quaternary ammonium cations with an anion. Quaternary ammonium cations are positively charged polyatomic ions with a generic formula of $NR_4^+$, with R being the same or different alkyl or aryl groups.

For purposes of the present invention, "cyclopolymerization" or "cyclocopolymerization" refers to a polymerization reaction where one or snore ring structures, heterocyclic or homocyclic, are formed.

For purposes of the present invention, a "repeat unit" or "repeating unit" is a part of a polymer or a resin whose repetition would produce the complete polymer chain (except for the end-groups) by linking the repeat units together successively along the chain.

The cross-linked copolymer of the present disclosure has a repeating unit that is represented by Formula 1 or Formula 2:

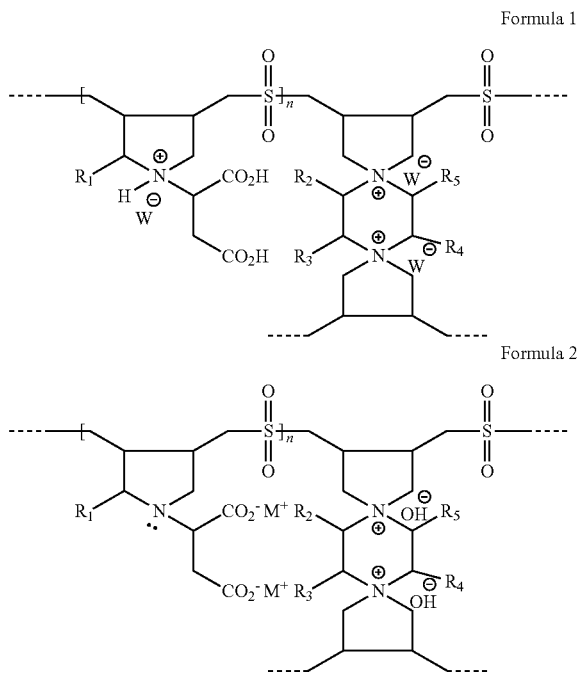

where:

$R_1$-$R_5$ are each independently a hydrogen, a halide, an optionally substituted $C_1$-$C_6$ allyl group, preferably a methyl group, or an optionally substituted ethyl group, preferably a hydrogen; $W^-$ in Formula 1 is $F^-$, $Cl^-$, $Br^-$, $I^-$, $NO_3^-$ or other suitable monoanion other than $OH^-$, preferably a halide, more preferably $Cl^-$; and $M^+$ in Formula 2 is $Li^+$, $Na^+$, $K^+$ or other suitable monocation other than $H^+$, preferably an alkali metal, more preferably $Na^+$; n=9-19.

The repeating unit can be repeated in the cross-linked copolymer macromolecule 10 to 10000 times, preferably 50 to 5000 times, more preferably 20 to 2500 times, 25 to 1500 times, 100 to 1000 times.

In certain embodiments, a copolymer of the present disclosure is synthesized using co-cyclopolymerization protocols as described in the literature with slight modifications as recognized as appropriate by a person of ordinary skill in the polymer chemistry art [Butler, G. B., Cyclopolymerization and cyclocopolymerization. Marcel Dekker, New York 1992: P. K. Singh, V. K. S., M. Singh, E-Polymers, 2007. 030: p. 1-34; S. Kudaibergenov, W. J., A. Laschewsky, Adv. Polym. Sci., 2006. 201: p. 157-224; and Jaeger, W., J. Bohrisch, and A. Laschewsky, Synthetic polymers with quaternary nitrogen atoms—Synthesis and structure of the most used type of cationic polyelectrolytes. Progress in Polymer Science, 2010. 35(5): p. 511-577; Ali, S. A. and O. C. S. Al-Hamouz, Comparative solution properties of cyclooopolymers having cationic, anionic, zwitterionic and zwitterionic/anionic backbones of similar degree of polymerization. Polymer, 2012, 53(15): p. 3368-3377; Abu-Thabit, N.Y., et al., Phosphonobetaine/sulfur dioxide copolymer by Butler's cyclopolymerization process. European Polymer Journal, 2011. 47(5): p. 1113-1123; Ali, S. A., et al, Synthesis and comparative solution properties of single-, twin-, and triple-tailed associating ionic polymers based on dial- lylammonium salts. Journal of Polymer Science Part A: Polymer Chemistry, 2006, 44(19): p. 5480-5494; Butler, G. B., Cyclopolymerization. Journal of Polymer Science Part A: Polymer Chemistry, 2000. 38(19): p. 3451-3461; McGrew, F. C., J. Chem., 1958. 35: p. 178-186 (references), each incorporated herein by reference in their entirety".

In a non-limiting example, a cross-linked copolymer can be synthesized by initially dissolving an aspartic acid derivative monomer and a cross-linking quaternary ammonium salt monomer in a non-aqueous solvent to form a polymer solution. Preferably, the non-aqueous solvent is a polar, aprotic solvent selected from but not limited to tetrahydrofuran (THF), ethyl acetate, acetone, dimethylformamide (DMF), acetonitrile (MeCN), dimethyl sulfoxide (DMSO), nitromethane and propylene carbonate. In one embodiment, the non-aqueous solvent is DMSO. The polymer solution, as prepared, contains the aspartic acid derivative monomer and the cross-linking quaternary ammonium salt monomer at a molar ratio of 10-20:1, preferably 10-15:1, more preferably 12-14:1. Sulfur dioxide is added to the polymer solution, for example, by gas absorption such that the polymer solution contains sulfur dioxide, the aspartic acid derivative monomer and the cross-linking quaternary ammonium salt monomer at a molar ratio of 15-18:12-14:1, preferably 15-17:13-14:1, more preferably 15-16:13-14:1. An initiator, azoisobutyronitrile is then mixed with the polymer solution to a final concentration of 25-100 mM, preferably 50-80 mM, more preferably 60-80 mM, even more preferably 70-80 mM, most preferably 75-80 mM. In alternative embodiments, a different initiator such as ammonium persulfate (APS), tetramethylethylenediamine (TEMED), riboflavin and TEMED may be used. The reaction mixture containing the different monomers and the initiator is mechanically stirred at 45-70° C., preferably 55-65° C. under an inert gas for 18-30 h. In one embodiment, the reaction mixture is stirred at 60° C. under $N_2$ for 24 h. Within 3-5 h of the stirring, a transparent swelled gel is formed. At the end of the stirring, a cross-linked polyzwitterionic acid polymer is formed. The acidic copolymer can be further basified by immersing and agitating the resin, for 3-8 h, in an alkaline solution (e.g. NaOH, KOH, ammonia) or advantageously, a series of alkaline solutions to ensure a complete ionic exchange, to form a cross-linked anionic polyelectrolyte polymer that is in basic form. The copolymer in basic form is washed and rinsed with water or a non-aqueous solvent, filtered and dried until the resin readies a constant weight.

Each repeating unit in a cross-linked copolymer in the present disclosure, as shown in Formulas 1 and 2, includes multiple ligand centers or chelating centers (i.e. central nitrogen atom of the quaternary ammonium group, $COO^{2-}$ and also possibly $X^-$, $OH^{-1}$) to which one or more metal ions can be coordinated. The metal ions that are coordinated to the plurality of ligand centers are preferably heavy metal ions, including but not limited to $Ag^+$, $Na^+$, $Pb^{2+}$, $Mn^{2+}$, $Fe^{2+}$, $Co^{2+}$, $Ni^{2+}$, $Cu^{2+}$, $Sn^{2+}$, $Cd^{2+}$, $Hg^{2+}$, $Cr^{3+}$, $Fe^{3+}$, $As^{3+}$, $Sb^{5+}$ and $Cr^{6+}$. In one embodiment, the number of ligand centers in a repeating unit of the copolymer, as represented by Formula 1 or Formula 2 and depending on the value of n, is 5 to 100, preferably 15 to 75, more preferably 25 to 50. Each metal atom is coordinated by a ligand center in a monodentate manner.

In view of the foregoing, a cross-linked copolymer according to the present invention possesses adsorption capacity towards a wide range of metal ions. The present disclosure further provides a method for removing metal ions from an aqueous solution by contacting and adsorbing the metal ions with the copolymer, in both batch mode and fixed-bed or column mode. Examples of metal ions that can be adsorbed by the cross-linked copolymer are outlined above.

In one embodiment, a cross-linked copolymer according to the present invention is effective in removing $Pb^{2+}$ ions from an aqueous sample. The initial concentration of $Pb^{2+}$ ions in the aqueous solution (batch mode) is 5-500 ppm, preferably 10-100 ppm.

In one or more embodiments, the cross-linked copolymer is present in the aqueous sample within a concentration range of 0.02-5.0 g $L^{-1}$ (per volume of the treated aqueous solution), preferably 0.5-3.0 g $L^{-1}$, more preferably 1.0-2.0 g $L^{-1}$. In one embodiment, an aqueous sample is treated with 1.5 g $L^{-1}$ of the copolymer.

In one or more embodiments, the method for removing metal ions is carried out at an aqueous sample pH range of 3-9, preferably 3-7, more preferably 3-6. In one embodiment, the, the aqueous sample has a pH of 6.0.

In one or more embodiments, a cross-linked copolymer of the present: disclosure is effective in adsorbing metal ions in an aqueous sample within a temperature of 10-100° C., preferably 20-80° C., more preferably 25-60° C., most preferably 25-40° C.

In one or more embodiments, the adsorption of metal ions by a cross-linked copolymer of the present invention in an aqueous solution is carried out for a duration of 5-180 min, preferably 10-120 min, more preferably 20-90 min. More than 90% of the metal ions present in the aqueous solution will be successfully removed at the end of the adsorption process, preferably more than 95%, more preferably more than 99%. Advantageously, more than 90% of the metal ions are removed within the first 15 min.

In at least one embodiment, the metal removal or adsorption process by a cross-linked copolymer of the present disclosure is an exothermic process, as indicated by a calculated negative ΔH value.

In at least one embodiment, the metal removal or adsorption process by a cross-linked copolymer of the present disclosure is a spontaneous process, as indicated by a calculated negative ΔG value.

In one or more embodiments, the cross-linked copolymer has a $Pb^{2+}$ adsorption capacity of 50-100 mg $g^{-1}$ based on the total weight of the copolymer, preferably 50-75 mg $g^{-1}$, more preferably 60-70 mg $g^{-1}$.

In certain embodiments, a cross-linked copolymer according to the present disclosure can be regenerated and reused as a heavy metal adsorbent for at least 5 cycles with minimal decrease in adsorption efficiency (no more than a 2% decrease in mercury removal with each regeneration cycle). To regenerate the adsorbent, metal ions are desorbed from a cross-linked copolymer and this can be achieved by treating a spent copolymer resin, i.e. a metal-loaded copolymer resin in an acidic or basic solution of at least 0.5 M in concentration. Strong acids and bases such as HCl, $H_2SO_4$, $HNO_3$, NaOH and KOH are preferred, but organic acids, weak acids and weak bases (e.g. acetic acid, ammonia etc.) may also be used for metal ion desorption process.

EXAMPLES

The examples below further illustrate protocols for preparing and characterizing the cross-linked copolymers described herein, and are not intended to limit the scope of claims.

In the following examples, a functionalized resin containing the derivatives of aspartic acid as monomers and where the monomers have unquenched nitrogen valency was synthesized by a cyclopolymerization protocol. FTIR, EDX, TGA and SEM characterization techniques were used to confirm the structural and morphological properties of the cross-linked dianionic polyelectrolyte (CAPE) resin. The resin displays an outstanding capability to remove $Pb^{2+}$ ions over a wide range of pH values. The contact time was found to have an effect upon $Pb^{2+}$ adsorption. The linearity of the plots t/qt vs. t implies the adsorption followed the pseudo-second order rate kinetics with high adsorption capacity. Fitting the data to Langmuir, Freundlich and Temkin models show that the Langmuir and Temkin models give a better correlation coefficient with $R^2$ of 0.99. Thermodynamic parameters were evaluated; the negative values of $\Delta G°$ indicate the spontaneity and the negative values of $\Delta H°$ (−43.87 KJ/mol) showed the exothermic nature of $Pb^{2+}$ sorption on the CAPE resin. Based on the characterization results, the CAPE resin would find applications as a highly efficient adsorbent in removal of heavy metal ions, especially lead ions from industrial wastewaters.

Example 1

Chemicals and Materials

Azoisobutyronitrile (AIBN) from Fluka AG was purified by crystallization from a chloroform-ethanol mixture. Dimethylsulfoxide (DMSO) was dried over calcium hydride overnight and then distilled under reduced pressure at a boiling point of 64-65° C. (4 mm Hg). Standard solution (1000 mg/L) of Pb(II), hydrochloric acid, nitric acid and sodium hydroxide were obtained from Sigma-Aldrich. The lead standard solution was utilized to prepare the required initial concentrations by dilution. All solvents used were of analytical grade.

Example 2

Physical Characterization Techniques

Field emission scanning electron microscope (FESEM) was used to characterize the surface morphology of the polymer before and after the adsorption of lead. Energy-dispersive X-ray spectroscope (EDX) equipped with a detector model X-Max was employed to obtain the elemental spectrum and to get elemental analysis of the pristine polymer and Pb(II)-loaded polymer. Thermo Scientific Ice 3000 flame atomic absorption spectrometer (FAAS) equipped with a 10 cm air-acetylene burner was used to monitor the concentration of Pb(II). The concentrations of some metal ions in real wastewater samples was analyzed by inductively coupled plasma mass spectrometry (ICP-MS) model ICP-MS XSERIES-II Thermo Scientific. IR spectra were recorded on a Perkin-Elmer 16F PC FTIR spectrometer. 1H and 13C spectra were measured on a JEOL LA 500 MHz spectrometer using HOD signal at d4.65 and dioxane signal at 67.4 ppm as internal standards, respectively. Thermogravimetric analysis (TGA) was carried out using a thermal analyzer SDT Q600, V20.9 Build 20 manufactured by TA instruments, USA. The temperature was raised at a uniform rate of 10° C./min. The analyses were made over a temperature range of 20-700° C. in an air-atmosphere flowing at a rate of 100 Ml/min.

The thermogravimetric analysis (TGA) curve of synthesized cross-linked dianionic polyelectrolyte (CAPE) shows three distinct weight loss steps. The first slow but gradual weight loss of about 20% is attributed to the removal of moisture and writer molecules embedded inside the cross-linked polymer. The second dramatic loss of about 25% around 320° C. is attributed to the loss of $S_2O$ due to polymer degradation. The third slow and gradual loss of 15% is attributed to the combustion of nitrogenous organics with the release of NOx, $CO_2$ and $H_2O$ gases. At 700° C., the residual mass was found to be 40%.

Example 3

Synthesis of Cross-Linked Polyzwitterionic Acid (CPZA) and Cross-Linked Dianionic Polyelectrolyte (CAPE)

To the best of the applicants, the following synthesis of the resins would represent the first example of cross-linked cyclopolymer containing the derivatives of aspartic acid as monomers by the cyclopolymerization protocol involving monomers having unquenched nitrogen valency. The cross-linker 1,1,4,4-tetrallylpiperazine-1,4-diium dichloride was prepared as reported in literature [Ali, S. A., S. Z. Ahmed, and E. Z. Hamad, Cyclopolymerization studies of diallyl- and tetrallylpiperazinium salts. Journal of Applied Polymer Science, 1996. 61 (7): p. 1077-1085 (reference), incorporated herein by reference in its entirety]. The monomer N,N-diallylaspartic acid hydrochloride was prepared via Michael addition of diallylamine to dimethyl maleate followed by hydrolysis of the Michael adduct in aqueous NaOH and neutralization with aqueous HCl.

Referring to FIG. 1, the synthesis process began where, to a solution of monomer monomer N,N-diallylaspartic acid hydrochloride (6.06 g, 24.2 mmol), cross-linker 1,1,4,4-tetrallylpiperazine-1,4-diium dichloride (0.582 g, 1.82 mmol) in DMSO (9.1 g) in a round bottom flask (50 ml), was absorbed $SO_2$ (1.78 g, 27.8 mmol) (from a cylinder) by gentle blowing it over the stirred surface of the solution. After the initiator AIBN (105 mg) was added, the reaction mixture was stirred at 60° C. under N for 24 h. Within 3-5 h, the magnetic stir-bar stopped moving; the reaction mixture became a transparent swelled gel. At the end of the elapsed time, the swelled gel of the cross-linked polyzwitterionic acid (CPZA) was soaked in water (48 h) with replacement of water several times. The swelled gel in water ($\approx$65 cm$^3$) was agitated with NaOH (1.6 g, 40 mmol) at room temperature for 5 h followed by further addition of NaOH (1.6 g, 40 mmol) and stirring for 1 h to ensure complete exchange with Na$^+$. The CPZA in acid form is less expanded owing to the zwitterionic form while the anionic form in resin, cross-linked dianionic polyelectrolyte, (CAPE), is highly expanded in the above alkaline mixture. The CAPE resin was dropped onto acetone (200 ml), filtered, dried at 60° C. under vacuum to a constant weight (7.7 g, 90%). (Found: C, 38.1; H, 4.6; N, 4.4; S, 9.5%). A terpolymer from N,N-diallylaspartic acid hydrochloride in disodium form $C_{10}H_{13}NNa_2O_4$ (93 mol %) and 1,1,4,4-tetrallylpiperazine-1,4-diium dichloride in the hydroxide form $C_{16}H_{30}N_2O_2$ (7 mol %) and $SO_2$ (100 mol %) requires C, 38.65; H, 4.41; N, 4.62; S, 9.93).

Hence, N,N-diallylaspartic acid hydrochloride, 1,1,4,4-tetrallylpiperazine-1,4-diium dichloride and $SO_2$ underwent cycloterpolymerization to give cross-linked polyzwitterionic acid (CPZA) which, upon basification with NaOH, afforded the cross-linked dianionic polyelectrolyte (CAPE) in an excellent overall yield of 90%. The resin CAPE has the unquenched nitrogen valency, which can act as a chelation center along with the two carboxylate motifs. It is postulated that the three basic centers (N and $CO_2^-$) in aspartic acid with different basicity constant impart chelation properties that enable sequestration of toxic metal ions.

Example 4

Adsorption of $Pb^{2+}$ on Cross-Finked Dianionic Polyelectrolyte (CAPE)

A 30 mg of adsorbent CAPE was added in 20 mL of aqueous $Pb^{2+}$ solution of specific concentration and then stirred for period of 2, 5, 10, 15, 20, 30, 40, 50, 60, 90 and 120 minutes respectively at 298 K. This study was carried out with different initial $Pb^{2+}$ concentrations ranging from 10 to 100 mgL$^{-1}$ while maintaining the adsorbent amount of 1.5 g L$^{-1}$. The resultant solution was filtered using a filter paper and the filtrate was analyzed by atomic absorption spectroscopy to determine the amount of $Pb^{2+}$ uptake. The pH of the solution was also measured during course of adsorption. The effect of pH was studied at 298 K with an initial $Pb^{2+}$ concentration of 40 mgL$^{-1}$. The kinetic and thermodynamic behaviors were studied in a similar manner with initial $Pb^{2+}$ concentration of 40 mgL$^{-1}$ at 298, 313 and 333 K respectively. The amount of $Pb^{2+}$ adsorbed by the adsorbent CAPE and the percentage removal of $Pb^{2+}$ were computed using the following Equations (1) and (2) respectively.

$$q_t = \frac{(C_i - C_t)V}{W} \quad (1)$$

$$\%Pb^{2+} \text{ uptake} = \left(\frac{C_i - C_t}{C_i}\right) \times 100 \quad (2)$$

Here, $C_i$ and $C_t$ are the initial and final concentrations of $Pb^{2+}$ ions in mg L$^{-1}$ respectively; V is the volume of solution in L with which the resin of weight W in gram is contacted. The adsorption capacity at various times and equilibrium are denoted as $q_t$ and $q_e$, respectively, where in the case of $q_e$, the equilibrium concentration $C_e$ is used instead of $C_t$.

Example 5

Fourier Transform Infrared Spectroscopy of Cross-Linked Dianionic Polyelectrolyte (CAPE)

The FT-IR spectra of the resin CAPE before and after adsorption experiments were examined. The unloaded resin (30 mg) was contacted with 40 mgL$^{-1}$ $Pb^{2+}$ concentration at adsorbent amount of 1.5 g L$^{-1}$ for 120 minutes at a pH of 6.0. It was filtered and dried under vacuum until constant weight was achieved.

The IR spectrum of cross-linked polyzwitterionic acid (CPZA) shows strong bands at 1727 cm$^{-1}$ and 1631 cm$^{-1}$ which are usually attributed to the asymmetric and symmetric stretchings of COOH [Al-Muallem, H. A., M. I. M. Wazeer, and S. A. Ali, Synthesis and solution properties of a new pH-responsive polymer containing amino acid residues. Polymer, 2002. 43(15): p. 4285-4295 (reference), incorporated herein by reference in its entirety]. These bands were also observed for the monomer N,N-diallylaspartic acid hydrochloride (spectrum not shown). The resin CPZA also contains bands at 1304 cm$^{-1}$ and 1125 cm$^{-1}$ which have been assigned in literature to asymmetric and symmetric bands of $SO_2$[Silvia Martinez-Tapia, H., et al., Synthesis and Structure of $Na_2[(HO_3PCH_2)3NH]1.5H_2O$: The First Alkaline Triphosphonate. Journal of Solid State Chemistry, 2000.

151(1): p. 122-129 (reference), incorporated herein by reference in its entirety]. In the unloaded cross-linked dianionic polyelectrolyte (CAPE), the C═O stretch shift dramatically to 1578.7 cm$^{-1}$ and 1406.8 cm$^{-1}$ for asymmetric and symmetric vibrations respectively because it is now in COO$^-$ form. After Pb$^{2+}$ adsorption an appreciable increase in the intensity and broadness of the COO$^-$ bands is noted [D. Kolodynska, Z.H.a.S.P.-P, FT-IR/PAS Studies of Cu(II)-EDTA Complexes Sorption on the Chelating Ion Exchangers. Acta Physica Polonica A, 2009. 116(3): p. 340-343 (reference), incorporated herein by reference in its entirety].

Example 6

Effect of pH on the Adsorption of Pb$^{2+}$ by CAPE

Figure 2:
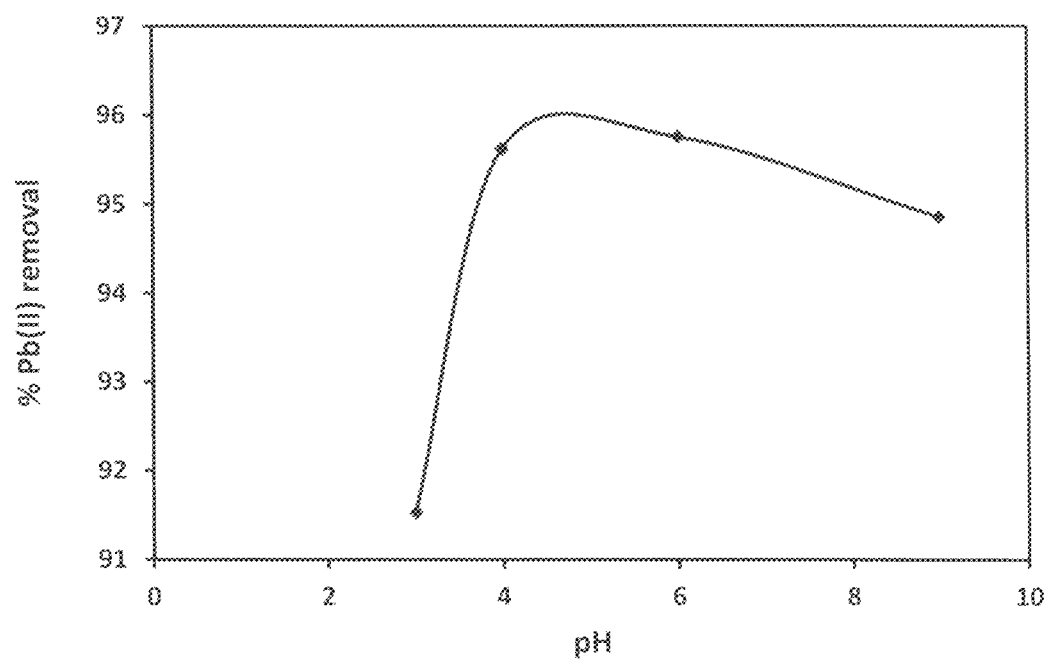
FIG. 2 is a curve illustrating the effect of pH on the adsorption of $Pb^{2+}$ ions.

The relationship between the initial pH of solution and the percentage removal of Pb$^{2+}$ is depicted in FIG. 2. In the pH range of 3-9, the Pb$^{2+}$ uptake was monitored by contacting the resin with 40 mgL$^{-1}$ lead (Pb$^{2+}$) solution for 15 min at room temperature. The percentage Pb$^{2+}$ removal initially increased from 91.5% to 95.8% as the pH increased from 3 to 6. Further increase of pH to 9 saw a gradual decrease of Pb$^{2+}$ uptake as percentage Pb$^{2+}$ dropped to 94.9%. It has been established that solution pH plays a critical role in metal ion adsorption process due to its influence on both the nature of the metal ions in solution and the state of the functional groups on the surface of the adsorbents [Plazinski, W. and W. Rudzinski, Modeling the Effect of pH on Kinetics of Heavy Metal Ion Biosorption. A Theoretical Approach Based on the Statistical Rate Theory. Langinuir, 2008. 25(1): p. 298-304 (reference), incorporated herein by reference in its entirety]. Studies have identified three forms of lead species: Pb$^{2+}$, Pb(OH)$^+$ and Pb(OH)$^2$ in the pH range 2.0-8.0. The distribution of these species as calculated by MINEQL software shows that Pb$^{24}$ is the preponderant species at pH between 1 and 6 and that its hydrolysis to Pb(OH)$^+$ and Pb(OH)$^2$ starts as pH increases while Pb(OH)$^2$ dominates at the pH higher than 6.0. [Dean, J. A., Lange's Hand Book of Chemistry. 1999; W. D. Schecher, D. C. M., MINEQL+: a chemical equilibrium program for personal computers (Version 4.5). Environmental Research Software, Hallowell, Me., USA, 2001 (references), each incorporated herein by reference in their entirety". Under low pH: (1) competition ensued between H+ and Pb$^{2+}$ and (2) the functional groups on the surface of the resin are in protonated forms which do not favor coordination with Pb$^{2+}$ species as they are repelled by the electrostatic force. Thus, the Pb$^{2+}$ absorption capacity of the resin is decreased [Liu, W.-J., et al., Adsorption of lead (Pb) from aqueous solution with Typha angustifolia biomass modified by SOCl2 activated EDTA. Chemical Engineering journal, 2011, 170(1): p. 21-28 (reference), incorporated herein by reference in its entirety]. As the pH is increased, this competition reduces and the functional groups on the resin are becoming less protonated, thereby making them more available for coordination with Pb$^{2+}$. This accounts for increased percentage removal that peaked pH 6.0. Beyond pH 6.0, there is deprotonation as basicity increases, and the functional groups are in anionic forms that should encourage greater coordination with Pb$^{2+}$. However, this did not increase the percent Pb$^{2+}$ removal as lead are now being hydrolyzed into Pb(OH)$^+$ and Pb(OH)$^2$ thereby reducing the amount of free Pb$^{2+}$ available for complexation. The rest of the adsorption experiments were carried out at pH 6.0.

Example 7

Effect of Initial Concentration on the Adsorption of Pb$^{2+}$ by CAPE

Figure 3:
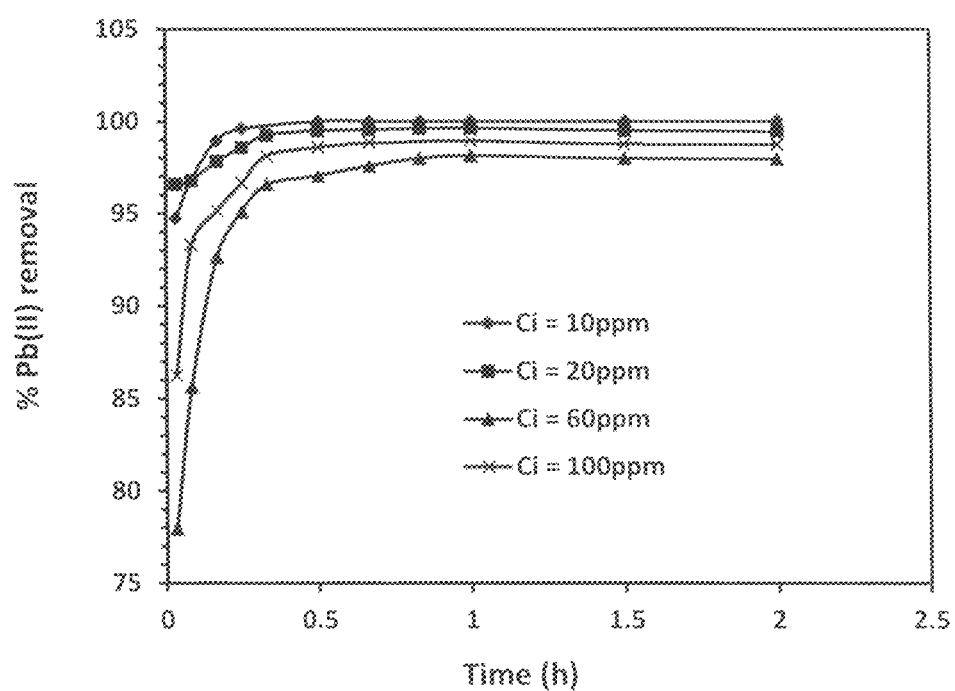
FIG. 3 is a series of curves illustrating the effect of $Pb^{2+}$ concentration on $Pb^{2+}$ removal.
Figure 4:
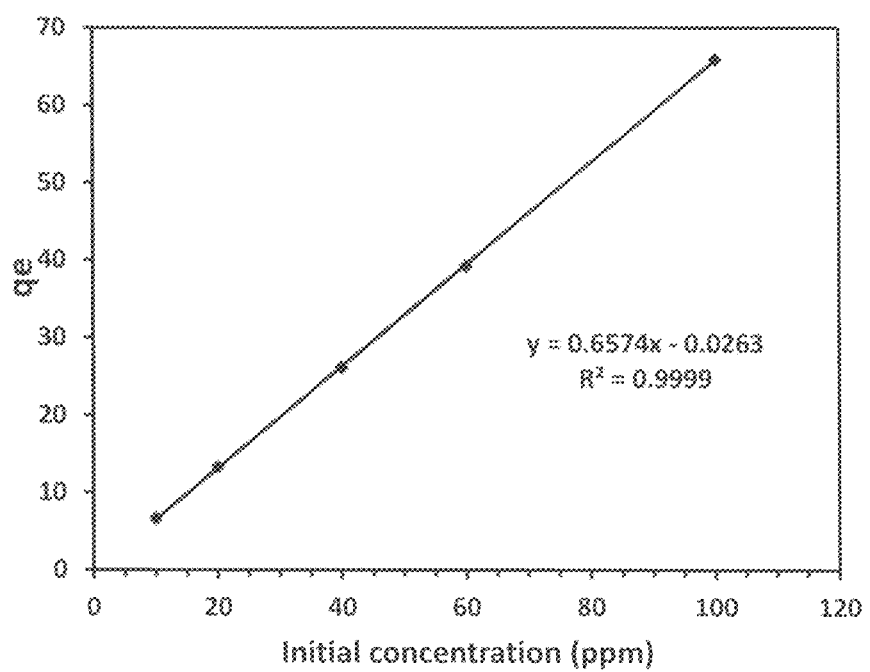
FIG. 4 is a line graph illustrating the effect of $Pb^{2+}$ initial concentrations on the adsorption capacity.
Figure 5A:
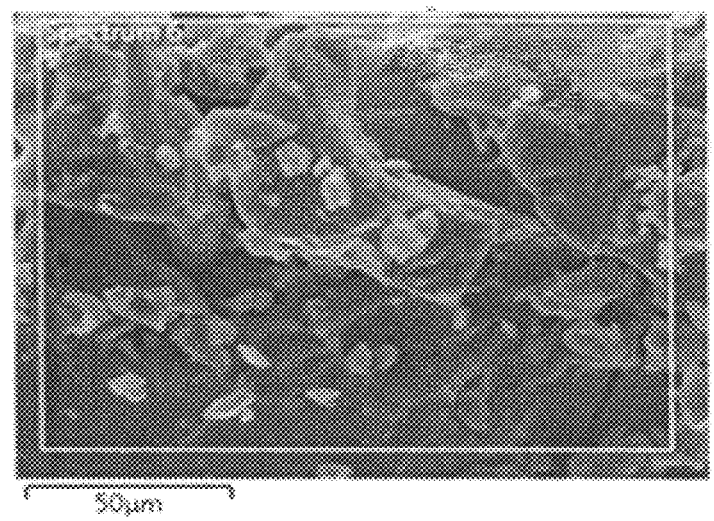
FIG. 5A is an SEM image of an unloaded crosslinked dianionic polyelectrolyte (CAPE).
Figure 5B:
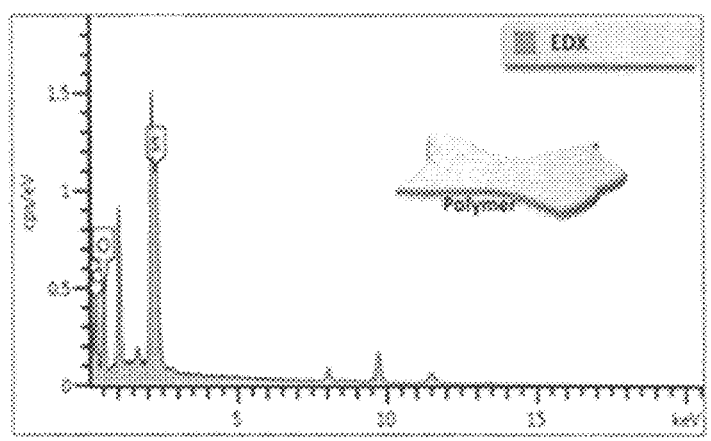
FIG. 5B is an EDX spectrum of the unloaded crosslinked dianionic polyelectrolyte (CAPE) of FIG. 5A.
Figure 6A:
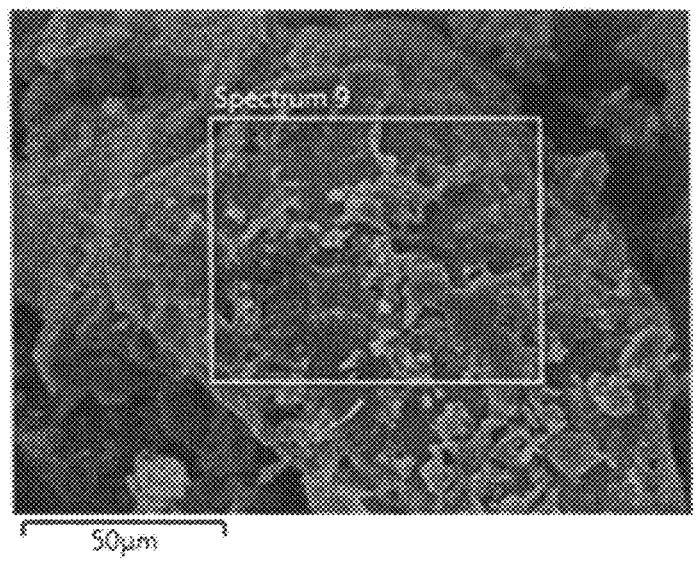
FIG. 6A is an SEM image of a $Pb^{2+}$-loaded crosslinked dianionic polyelectrolyte (CAPE).
Figure 6B:
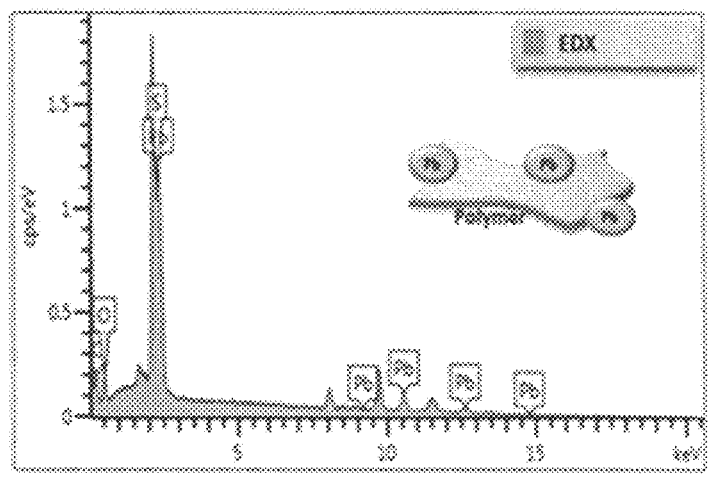
FIG. 6B is an EDX spectrum of the $Pb^{2+}$-loaded crosslinked dianionic polyelectrolyte (CAPE) of FIG. 6A.

FIG. 3 depicts the effect of initial concentration of Pb$^{2+}$ on the percentage Pb$^{2+}$ removal by cross-linked dianionic polyelectrolyte (CAPE). It can be seen that the percentage removal for the Pb$^{2+}$ rapidly increases from 0 min to about 25 min contact time and thereafter slowly until it reaches equilibrium. This is due to the fact that the adsorption kinetic depends on the surface area of the adsorbent which is largely uncovered at the start of the experiment (0 contact time). Therefore, the rate of adsorption at the early time increases rapidly until it reaches a point where the remaining fewer adsorption sites are competed for by lead ions. Hence the rate of adsorption slows down until it reaches equilibrium [Aroua, M. K., et al., Real-time determination of kinetics of adsorption of lead(II) onto palm shell-based activated carbon using ion selective electrode. Bioresource Technology, 2008. 99(13): p. 5786-5792 (reference), incorporated herein by reference in its entirety]. This is situation is observed for all the initial concentration of lead ranging from 10-100 ppm. The effect of the amount of adsorbate was also investigated and it was observed that the adsorption capacity of CAPE increases as the concentration of Pb$^{2+}$ is raised from 10 up till 100 ppm, as seen in FIG. 4.

Example 8

Adsorption Kinetics

The dynamics of the interaction at the solid-solution interface during the adsorption of Pb$^{2+}$ from aqueous solution can be described in terms of the following kinetic models:

Pseudo First-Order (Lagergren) Kinetics

Pseudo first-order relates the adsorption rate of solute to adsorption capacity of the adsorbent. The linear form of the equation is given by Equation (3) [S. Lagergren, K. S., Vetenskapsakad, Handl., 1898. 24: p. 1-39 (reference), incorporated herein by reference in its entirety].

$$\log(q_e - q_t) = \log q_e - \left(\frac{k_1 t}{2.303}\right) \quad (3)$$

where $q_e$ and $q_t$ are the amounts of Pb$^{2+}$ adsorbed in (mg g$^{-1}$) at equilibrium time and at any time, t, respectively and $k_1$ is the first order rate constant in (h$^{-1}$). A linear plot of log (qe−qt) versus t yields a straight line for the pseudo first-order kinetics from which $k_1$ and $q_{e,cal}$ are calculated. The combined Lagergren plots for the various initial concentrations of Pb$^{2+}$ used for the kinetic studies when adsorbent amount is kept at 1.5 gL$^{-1}$. The kinetic parameters extracted from these plots are displayed in Table 1. Judging from the fittings, it can be seen that there is generally good linearity of Lagergren Pseudo first-order plots as $R^2$ ranges from 0.95 to 0.99 for all the plots (Table 1). The rate constants $k_1$ are determined to vary between 2.7 to 16.38 h$^{-1}$. There is a general downward trend of $k_1$ as initial concentrations increase. However, considering the equilibrium adsorption capacities reveal a sharp disagreement between the experimentally observed $q_{e,exp}$ and that derived from Largergren pseudo first-order plots, $q_{e,cal\ 1}$, as shown in Table 1. This is understood to mean that even though, the model fits Pb$^{2+}$ adsorption data quite fairly, it is not suitable for estimation of $q_{e,cal\ 1}$ as it is not a true first order equation where the intercept of the plot of log $(q_e-q_t)$ versus t should be equal to log $q_e$ as in Equation (3) [Ho, Y. S. and G, McKay, Comparative sorption kinetic studies of dye and aromatic compounds onto fly ash. Journal of Environmental Science and Health, Part A, 1999. 34(5): p. 1179-1204 (reference), incorporated herein by reference in its entirety].

in the external, macropore and micropore surfaces leading to multi-linear plots suggesting that other processes might play roles in the adsorption [Vergili, I., et al., Study of the Removal of Pb(II) Using a Weak Acidic Cation Resin: Kinetics, Thermodynamics, Equilibrium, and Breakthrough Curves. Industrial & Engineering Chemistry Research, 2013. 52(26): p. 9227-9238; Wu, F. C., R. L. Tseng, and R. S. Juang, Adsorption of Dyes and Phenols from Water on the

TABLE 1

Adsorption kinetic parameters for Lagergren models.

| Concentration (ppm) | Pseudo 1st order | | | | Pseudo 2nd order | | | |
|---|---|---|---|---|---|---|---|---|
| | $q_{e,exp}$ (mg g$^{-1}$) | $k_1$ (h$^{-1}$) | $q_{e,cal}$ (mg g$^{-1}$) | $R^2$ | $q_{e,cal}$ (mg g$^{-1}$) | $k_2$ (g mg$^{-1}$ h$^{-1}$) | $h^a$ (mg g$^{-1}$ h$^{-1}$) | $R^2$ |
| 10 | 6.63 | 16.4 | 0.606 | 0.9854 | 6.70 | 55.7 | 2.50 × 10$^3$ | 1.000 |
| 20 | 13.3 | 10.1 | 0.908 | 0.9450 | 13.3 | 56.7 | 1.00 × 10$^4$ | 1.000 |
| 40 | 26.5 | 2.70 | 1.595 | 0.9562 | 26.3 | 8.10 | 5.60 × 10$^3$ | 0.9999 |
| 60 | 39.2 | 6.93 | 8.383 | 0.9541 | 39.4 | 3.23 | 5.01 × 10$^3$ | 1.000 |
| 100 | 59.4 | 4.97 | 3.964 | 0.9640 | 59.5 | 2.82 | 9.98 × 10$^3$ | 1.000 |

$^a$Initial adsorption rate, $h = k_2 q_e^2$

Pseudo Second-Order Kinetics

The failure of Lagergren first-order kinetic model to correctly estimate the equilibrium adsorption capacity $q_e$ drives us to pseudo second-order kinetic model for analysis of the dynamics. The linear form of the pseudo second order model can be written as:

$$\frac{t}{q_t} = \frac{1}{k_2 q_e^2} + \frac{t}{q_e} \quad (4)$$

Here, $k_2$ (g mg$^{-1}$ h$^{-1}$) is pseudo second order rate constant, $q_e$ and $q_t$ are the adsorption capacities at equilibrium and at any time t respectively [Ho, Y. S. and G. McKay, Pseudo-second order model for sorption processes. Process Biochemistry, 1999. 34(5): p. 451-465 (reference), incorporated herein by reference in its entirety]. A plot of $t/q_t$ against t, gave linear relationship allowing for the calculation of $q_e$ and $k_2$ as displayed in table 1. The initial adsorption rate is also presented as $h-k_2 q_e^2$. As can be seen from Table 1, pseudo second-order model gave an excellent fitting for the adsorption data with the square of regression coefficient of unity for all the experiments Interestingly, as can also be seen in Table 1, the calculated equilibrium adsorption capacities, $q_{e,cal\ 2}$, show very nice agreement with the experimentally observed, $q_{e,exp}$ Minceva, M., L, Markovska, and V. Meshko, Removal of Zn 2+, Cd 2+ and Pb$^{2+}$ from binary aqueous solution by natural zeolite and granulated activated carbon. 2007. Vol. 26. 2007 (reference), incorporated herein by reference in its entirety].

Intra-Particle Diffusion

The Weber-Morris intraparticle diffusion was used as a model to evaluate the diffusion contribution of Pb$^{2+}$ adsorption within the resin. A plot of $q_t$ against $t^{1/2}$ as represented by Equation (5) should give a straight line if the mechanism of the adsorption is controlled by the diffusion of the adsorbate ions within the particle in the pore of the adsorbent [W. J. Weber. J. C. M., Eng. Div. Am. Soc. Civ. Eng., 1963. 89: p. 31-60; Annadurai, G., R.-S. Juang, and D.-J. Lee, Use of cellulose-based wastes for adsorption of dyes from aqueous solutions. Journal of Hazardous Materials, 2002, 92(3): p. 263-274 (references), each incorporated herein by reference in their entirety]. The diffusion process may take place Activated Carbons Prepared from Corncob Wastes, Environmental Technology, 2001. 22(2): p. 205-213 (references), each incorporated herein by reference in its entirety".

$$q_t = k_{id} t^{1/2} + x_i \quad (5)$$

where $q_t$ is the adsorption capacity at any time t, $k_{id}$ is the intraparticle diffusion rate constant (mg/g hr.) and $x_i$ is a constant that takes into account the boundary layer thickness. It can be seen from table 1 that the diffusion model exhibits three distinct parts for the duration of the study at different temperatures. The effects of temperature on the Weber-Morris parameters are displayed in fable 2. At 298K, from the start of the process, the first and second straight portions of the curve with steep slopes reflect the easy diffusion of Pb$^{2+}$ ion inside the macropores of the cross-linked dianionic polyelectrolyte (CAPE) resin while the third part, indicates the slow diffusion within the micropore. It is informative to note that the third part shows a gradual approach to equilibrium which, is an indication of a concentration dependent diffusion process [Rengaraj, S., et al., Adsorption characteristics of Cu(II) onto ion exchange resins 252H and 1500H: Kinetics, isotherms and error analysis. Journal of Hazardous Materials, 2007, 143(1-2): p. 469-477 (reference), incorporated herein by reference in its entirety]. This result is in agreement with pseudo-second order kinetic model. Experiments conducted at 313 and 333K show similar behavior but with gradual decrease in $k_{id}$ and their regression coefficients, as shown in Table 2.

TABLE 2

Intraparticle diffusion parameters.
Intraparticle diffusion model

| Temperature (K) | $k_{id}$ (mg g$^{-1}$ h$^{-1}$) | $x_i$ (mg g$^{-1}$) | $R^2$ |
|---|---|---|---|
| 298 | 2.12 | 24.7 | 0.9812 |
| 313 | 0.998 | 25.15 | 0.9807 |
| 333 | 0.413 | 25.14 | 0.9804 |

Adsorption Isotherm Models

The basic assumptions in Langmuir isotherm are that the adsorption is a monolayer type on a homogeneous surface where the adsorption at one site is completely independent of the other [Langmuir, I., The Adsorption of Gases on Plane Surfaces of Glass, Mica and Platinum. Journal of the American Chemical Society, 1918. 40(9): p. 1361-1403 (reference), incorporated herein by reference in its entirety] It can be expressed in linear form as Equation (6) follows:

$$\frac{C_e}{q_e} = \frac{C_e}{Q_m} + \frac{1}{Q_m b} \quad (6)$$

where $Q_m$ is the quantity of adsorbate required to form a single monolayer on a unit mass of the adsorbent (mg g$^{-1}$), $Q_e$ is the amount adsorbed on a unit mass of adsorbent (mg g$^{-1}$) at equilibrium concentration $C_e$ (mgL$^{-1}$) and b is an equilibrium constant that takes care of the apparent energy of adsorption. A plot of $C_e/q_e$ against $C_e$ yielded a straight line in agreement with Langmuir isotherm giving the isotherm parameters as depicted in Table 3.

Comparisons of adsorption capacities from the Langmuir isotherm of the current adsorbent for the removal of Pb$^{2+}$ with those of other adsorbents reported in the literature is displayed in Table 4. All the references listed in Table 4 are incorporated by reference in their entireties. Based on the reported Pb$^{2+}$ adsorption capacities, it: can be concluded that the CAPE resin of the present disclosure compares favorably against and is superior to these adsorbents.

Additional analysis was also made by using the dimensionless equilibrium parameter $R_L$ which is a measure of the favorability of adsorption. $R_L$ values are found to range from 0.09 to 0.90, which means that it is favorable adsorption process,

TABLE 3

Isotherm constants for adsorption of Pb$^{2+}$ on CAPE.

| Adsorption Isotherms | Isotherm | Parameters | $R^2$ |
| --- | --- | --- | --- |
| Langmuir | $Q_m$ | 64.5 mg g$^{-1}$ | 0.9943 |
|  | b | 2.07 mg$^{-1}$ |  |
| Freundlich | $k_f$ | 34.2 | 0.9323 |
|  | n | 2.23 |  |
| Temkin | A | 34.8 Lg$^{-1}$ | 0.9948 |
|  | b | 221 J mol$^{-1}$ |  |

TABLE 4

Comparison of the adsorption capacity of the resin and those of various adsorbents in literature for Pb$^{2+}$ as computed by the linear Langmuir equation.

| Sorbent Materials | Adsorption Capacity (mg/g) | Reference |
| --- | --- | --- |
| Commercial silica | 3.9 | Chiron, N., R. Guilet, and E, Deydier, *Adsorption of Cu(II) and Ph(II) onto a grafted silica: isotherms and kinetic model.*, Water Research, 2003. 37(13): P. 3079-3086 |
| Zeolites: Chabazite | 6.0 | Ouki, S.K. and M. Kavannagh, *Performance of Natural Zeolites for the Treatment of Mixed Metal-Contaminated Effluents.* Waste Management & Research, 1997. 15(4): p. 383-394. |
| Activated carbon | 6.68 | Mishra, P.C. and R.K. Patel, *Removal of lead and zinc ions from water by low cost adsorbents.* Journal of Hazardous Materials, 2009. 168(1): p. 319-325. |
| Porous lignin-based sphere | 27.1 | Li, Z., Y. Ge, and L. Wan, *Fabrication of a green porous lignin-based sphere for the removal of lead ions from aqueous media.* Journal of Hazardous Materials, 2015. 285(0): p. 77-83 |
| Diethylenetriamine-bacterial cellulose | 31.4 | Shen, W., et al., *Adsorption of Cu(II) and Pb(II) onto diethylenetriamine-bacterial cellulose.* Carbohydrate Polymers, 2009. 75(1): p. 110-114. |
| Ethylenediamine modified cellulose | 50.0 | Musyoka, S.M., et al., *Synthesis, Characterization, and Adsorption Kinetic Studies of Ethylenediamine Modified Cellulose for Removal of Cd and Pb.* Analytical Letters, 2011. 44(11): p. 1925-1936, |
| Porous lignin xanthate resin | 62.6 | Li, Z., Y. Kong, and Y. Ge, *Synthesis of porous lignin xanthate resin for Pb2+ removal from aqueous solution.* Chemical Engineering Journal, 2015. 270(0): p. 229-234. |
| Cross-linked dianionic polyelectrolyte (CAPE) | 64.5 | The present disclosure |

Freundlich Isotherm

The Freundlich isotherm describes multilayer adsorption taking place on a heterogeneous surface. As in many systems, the heat of adsorption decreases with increasing extent of adsorption but this model unifies the energy [Freundlic, H. M. F., Uber die adsorption in losungen. Zeitschrift fur Physikalische Chemie (Leipzig), 1906. 57A: p. 385-470 (reference), incorporated herein by reference in its entirety]. The linear form is given as Equation (7) as follows:

$$\log q_e = \log k_f + \frac{1}{n} \log C_e \quad (7)$$

where $k_f$ is the Freundlich constant and n is the heterogeneity factor which is a measure of deviation from linearity. Table 3 shows a high n of about 2 which is far from unity and $R^2$ of 0.93.

Temkin Isotherm

The Temkin isotherm takes into consideration the interaction between adsorbate and adsorbent with the consequence that the heat of adsorption of all the molecules in the layer decreases linearly with further coverage [M. J. Tempkin, V. P. J. T., V. Pyzhev, Acta Physiochim URSS; 1940; p. 217-222 (reference), incorporated herein by reference in its entirety]. The linear form is given as Equation (8) as follows:

$$q_e = \frac{RT}{b} \ln A + \frac{RT}{b} \ln C_e \quad (8)$$

where T is the absolute temperature in Kelvin (K), R is the molar gas constant. (8.3.14 J mol$^{-1}$ K$^{-1}$), A represent the equilibrium binding constant (L g$^{-1}$) corresponding to maximum binding energy and b (Jmol$^{-1}$) is related to the heat of adsorption. The intercept and slope from the plot of qe versus log Ce enabled determination of A and b as displayed in Table 3. Judging from the high value of the coefficient of determination $R^2=0.9948$, it can be concluded that Temkin isotherm model describe this equilibrium very well.

Example 9

Adsorption Activation Energy

The activation energy of adsorption can be computed from the Arrhenius equation presented as follows:

$$\ln k_2 = \frac{E_a}{2.303\ RT} + \text{constant} \quad (9)$$

where $E_a$ (kJmol$^{-1}$) is the activation energy, $k_2$ (g mg$^{-1}$ h$^{-1}$) is the second order rate constant as shown in table 1 and R is the molar gas constant (8.314 J mol$^{-1}$ K$^{-1}$) and T is the temperature of the solution in Kelvin. Plotting In $k_2$ against 1/T gave a linear relation whose slope (Ea/R) allowed us to determine activation energy of adsorption Table 5. From Table 5, the activation energy is 39.29 kJmol$^{-1}$, which is low and therefore, is an indication of the favorability of the adsorption process.

TABLE 5

Thermodynamic and kinetic parameters for Pb$^{2+}$ adsorption on CAPE.

| Temp (K) | ΔG (kJ mol$^{-1}$) | ΔH (kJmol$^{-1}$) | ΔS (Jmol$^{-1}$ K$^{-1}$) | E$_a$ (kJmol$^{-1}$) |
|---|---|---|---|---|
| 298 | −11.1 | | | |
| 313 | −9.41 | −43.9 | −110 | 39.3 |
| 333 | −7.20 | | | |

Example 10

Thermodynamics of Adsorption

Studies on adsorption thermodynamics have employed the ratio of $q_e/C_e$ as the distribution constants K in the Vant-Hoff equation to derive the adsorption thermodynamic parameters [Sheha, R. R. and A. A. El-Zahhar, Synthesis of some ferromagnetic composite resins and their metal removal characteristics in aqueous solutions. Journal of Hazardous Materials, 2008. 150(3): p. 795-803 (reference), incorporated herein by reference in its entirety]. The equation is modified to give Equations (10) and (11) as follows:

$$\ln\left(\frac{q_e}{C_e}\right) = -\frac{\Delta H}{RT} + \frac{\Delta S}{R} \quad (10)$$

$$\Delta G = \Delta H + T\Delta S \quad (11)$$

where, all the letters and symbols have their usual meanings. The thermodynamic parameters extracted from the plot are shown in Table 5. From Table 3, it is evident that as temperature climbs up from 298 to 333 K, the free energy change ΔG becomes less negative meaning that as an exothermic process, it is not favored at higher temperatures. The ΔH of −43.87 kJmol$^{-1}$ also corroborates this observation. The negative change in entropy Δ4 of −110.11 J mol$^{-1}$ K$^{-1}$ suggest a significant fall in randomness at solution-solid interface during adsorption.

Example 11

SEM and EDX Analyses of Unloaded CAPE and Pb$^{2+}$-Loaded CAPE

A scanning electron microscope (SEM) and energy dispersive X-ray (EDX) analysis was performed for examining the surface morphology and the structure of the polymer before and after the adsorption, with images and spectra shown in FIGS. 5A-5D. The EDX spectrum recorded for lead-loaded polymer adsorption (FIG. 5B) indicates the main characteristic peaks for Pb$^{2+}$ at 2.34 and 10.55 keV in addition, to the peaks of the other elements of the polymer structure FIG. 5A. This confirms the binding of Pb$^{2+}$ to the surface of the polymer. SEM images are depicted in the FIGS. 5A and 5C.

Example 12

Treatment of Real Wastewater Samples

Samples of industrial wastewater were used to study the effect of real water matrix and to evaluate practical application of the polymer. The samples were spiked with 0.0 and 20 mg/L Pb$^{2+}$, and then treated with polymer under the optimum conditions. Table 6 presents the ICP results of the analysis of wastewater sample and wastewater sample after being treated with the prepared polymer. It also presents the analysis of wastewater sample after being spiked with 20 ppm Pb$^{2+}$ and then treated with the prepared polymer. The results the real wastewater matrix. This indicates the high efficiency and capability of polymer to be regarded as a potential adsorbent for high efficient and renewable adsorbent for Pb$^{2+}$ ions from aqueous solutions.

TABLE 6

Comparison of Pb(II) concentrations in wastewater sample before and after the treatment with the polymer resin

| Metal | Original sample (μgL$^{-1}$) | Original sample spiked with 20000 μgL$^{-1}$ Pb$^{2+}$ and then treated with the CAPE adsorbent |
|---|---|---|
| Pb | 0.453 | 357.2 |
| Co | 0.362 | 0.213 |
| Cu | 857.14 | 418.20 |
| As | 8.14 | 3.351 |
| Mo | 36.12 | 10.4 |
| Cd | 1.17 | 0.087 |
| Hg | 213.11 | 133.4 |

MDL: the method detection limit

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible valiants of the teachings herein, defines, in part, the scope of the foregoing claim terminology such that no inventive subject matter is dedicated to the public.

The invention claimed is:

1. A method for removing one or more heavy metals ions from an aqueous solution, comprising
contacting the aqueous solution with a copolymer to adsorb the heavy metal ions on the copolymer,
wherein the copolymer comprises:
an aspartic acid derivative;
a quaternary ammonium salt; and
sulfur dioxide;
wherein the copolymer has a structure with a repeating unit represented by Formula 1 or Formula 2:

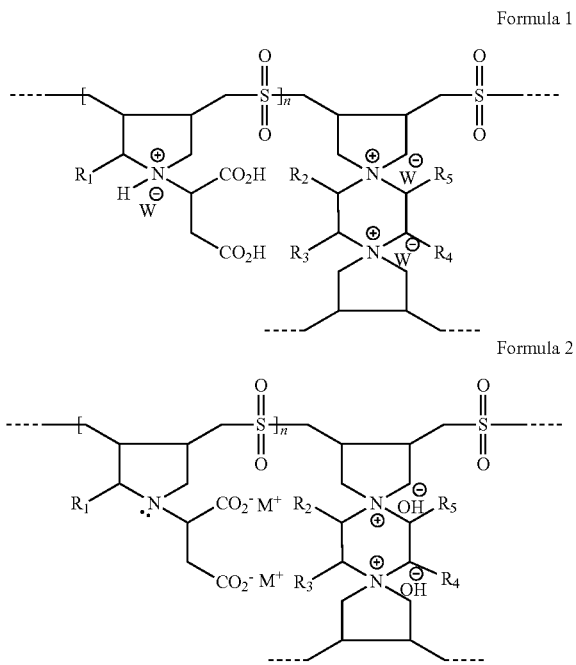

Formula 1

Formula 2 wherein:
$R_1$-$R_5$ are each independently a hydrogen, a halide, an optionally substituted methyl group, or an optionally substituted ethyl group;
in Formula 1, each $W^-$ is $F^-$, $Cl^-$, $Br^-$, $NO_3^-$ or other suitable monoanion other than $OH^-$;
in Formula 2, each $M^+$ is $Li^+$, $Na^+$, $K^+$ or other suitable monocation other than $H^+$; and
$n=9$-$19$.

2. The method of claim 1, wherein in the copolymer a quaternary ammonium salt cross-links one polymer chain of the copolymer to another polymer chain of the copolymer.

3. The method of claim 1, wherein the aspartic acid derivative comprises a quaternary nitrogen atom.

4. The method, copolymer of claim 1, wherein $R_1$ is a hydrogen.

5. The method of claim 1, wherein the copolymer is in a basic and anionic form.

6. The method copolymer of claim 1, wherein the copolymer has a repeating unit represented by Formula 1, wherein:
$R_1$-$R_5$ are each a hydrogen; and
$W^-$ is $Cl^-$.

7. The method of claim 1, wherein the copolymer has a repeating unit represented by Formula 2, wherein:
$R_1$-$R_5$ are each a hydrogen; and
$M^+$ is $Na^+$.

8. The method of claim 1, wherein the copolymer has a repeating unit having a $Pb^{2+}$ adsorption capacity of 50-100 mg $g^{-1}$ based on a total weight of the copolymer.

9. The method of claim 1, wherein the copolymer has a concentration of 0.02-5.0 g $L^{-1}$ in the aqueous solution.

10. The method of claim 1, wherein the contacting is carried out at a temperature of 10-100° C.

11. The method of claim 1, wherein the contacting is carried out at an aqueous sample pH range of 3 to 9.

* * * * *